C. LIVAUDAIS.
Improvement in Fish-Nets.
No. 132,476. Patented Oct. 22, 1872.
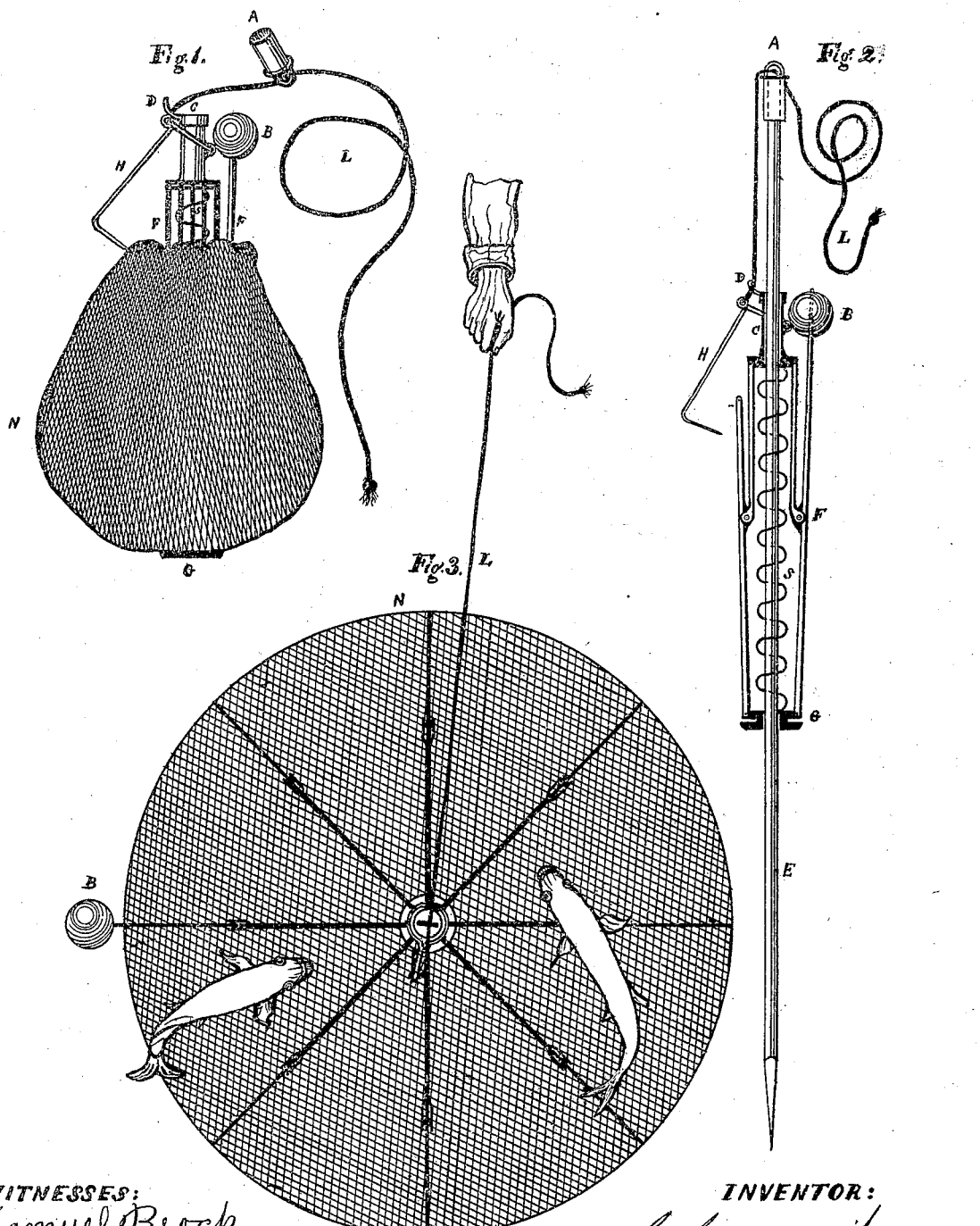
WITNESSES:
Samuel Brock
Carson Mudd
INVENTOR:
C. Livaudais

UNITED STATES PATENT OFFICE.

CHARLES LIVAUDAIS, OF NEW ORLEANS, LOUISIANA, ASSIGNOR OF ONE-FOURTH HIS RIGHT TO CARSON MUDGE, OF SAME PLACE.

IMPROVEMENT IN FISH-NETS.

Specification forming part of Letters Patent No. 132,476, dated October 22, 1872.

*To all whom it may concern:*

Be it known that I, CHARLES LIVAUDAIS, of the city of New Orleans, parish of Orleans, State of Louisiana, have made certain new and useful Improvements in Fish-Nets.

The object of this invention is to provide a fish-net simple in its construction and requiring neither skill or any great amount of muscular strength to manipulate it.

This invention is well adapted for fishing in shallow water, and can be manipulated to inclose the fish by a person stationed at a long distance from the net. This invention and improvement is particularly well adapted for utilizing the fish to effect its own capture, and at the same time signaling the fisherman of the success in capturing one or more fish; and the fisherman can, at his leisure, remove the fish from the net and reset it again for further successes.

Figure 1 is a vertical view of the net when it is closed up and disconnected from the staff. Fig. 2 is a section of the mechanism employed to stretch out and close up the net. Fig. 3 is a horizontal view of the net when it is stretched out for fishing.

Referring to the drawing, E represents a staff of suitable length, and pointed at the lower end for ease of planting it in the ground. F represents the radial arms, over and to which the netting is secured. G represents a loose and sliding collar or socket, in which the radial arms are articulated. C represents a loose and sliding collar or socket with articulated braces radiating out from it; and these braces are articulated at their outer ends to the radial arms, and near the center of the arms longitudinally. S represents a spring working loosely on the staff and between loose collars G and C. H represents a trigger-hook jointed on loose collar C. D represents a fulcrum and guide, rigidly secured to loose collar C. L represents a tripping-line. One end of it is attached to the trigger-hook and the other end of it is in the hands of the fisherman. B represents a ball placed on the outer end of the radial arm. This radial arm is much longer than the balance of the arms. The office of this ball is to serve as a signal to the fisherman, who is stationed at a distance, that the net has been tripped or closed, and for him to come and remove the captured fish. A represents a thimble-shaped guide, which is placed loosely on the upper end of the staff. The best description that can be given of this improvement is to compare it with the ordinary umbrella, with these exceptions, namely: The fabric used to shut off the rain is dispensed with and replaced by a net-work of twine. Both collars holding the radial arms and braces are loose and sliding on the staff; and to close up the net the two collars are forced apart by a spiral spring; and when the net is distended in place for fish-catching the two loose collars are brought together, thus compressing the spiral spring; then all parts are secured in that position by hooking the two loose collars together by the trigger-hook.

The operation is as follows: The staff E is rigidly driven in the ground where there is a sufficient depth of water for fishing. The net is then placed in proper position, with the staff E passing through the loose collar G, spiral spring S, and loose collar C; and one end of the tripping-line is passed through the thimble-shaped loose guide A, which is in place on the top end of the staff. This end of the line is continued on through the rigid guide and fulcrum D, and it is then made fast to the upper end of the trigger-hook H; then the loose collar C is forced down, thus compressing together both ends of the spiral spring and actuating the articulated braces to distend the radial arms F and net N. The loose collars are then hooked together by the trigger-hook H. Bait of any suitable kind can be placed on the net and secured to the trigger-hook; and the free end of the tripping-line L is passed to any suitable place that the fisherman may elect to operate or trip the net from.

The strength of the fish can be utilized for the tripping of this net, thus causing their own capture, and the signalizing to the fisherman the success. This operation will be as follows: The net will be properly set with the fish-bait well secured to the trigger-hook H. The fish, in attempting to pull away the bait, detaches the trigger-hook, trips the net, the spiral spring expands, and the loose collar C is forced upward, which, in turn, actuates the articulated braces and radial arms; and the ball B is raised and held above the water as a signal that the work has been accomplished, and nothing remains to be done except removing the fish from the net; and the operation can be repeated continuously.

This general arrangement of net and mechanism can be used for capturing birds and water-fowl.

I do not claim any particular kind or shape of trigger-hook, but reserve to myself the right to use any of the well-known devices of that nature.

I do not limit myself to any specified number of radial arms and articulated braces; but What I do declare is new and useful, and desire to secure by Letters Patent, is—

1. The combination of the staff E, loose collar G, radial arms F, and net-work N, all constructed substantially as and for the purpose set forth.

2. The combination of the staff E, loose collar C, trigger-hook H, and tripping-line L, all constructed substantially as and for the purpose described.

3. The combination of the staff E, loose collars G and C, thimble-shaped loose guide A, rigid fulcrum D, and trigger-hook H, all constructed substantially as and for the purpose set forth.

4. The fish-net, when constructed as described, operated as described, and for the purpose set forth.

CHARLES LIVAUDAIS.

Witnesses:
CARSON MUDGE,
VR. FABRAUCHE.